(No Model.)
F. BENOIT.
SWEAT PAD FASTENING FOR HORSE COLLARS.
No. 369,496. Patented Sept. 6, 1887.
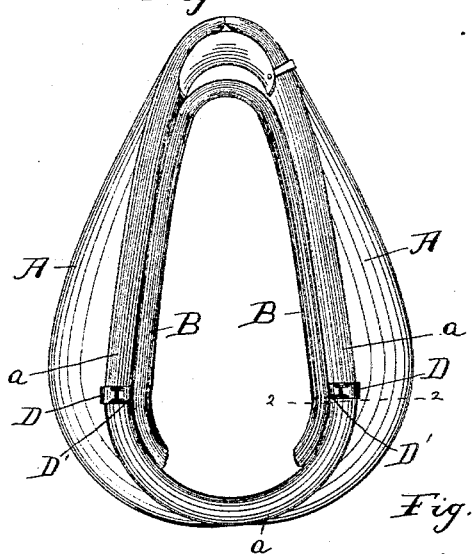
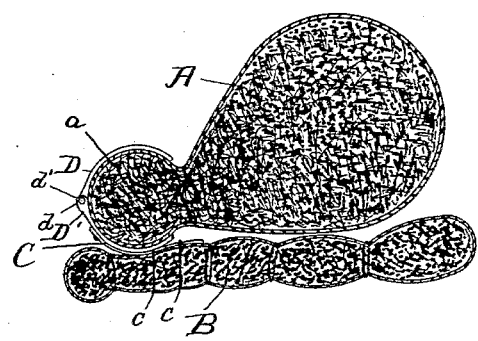
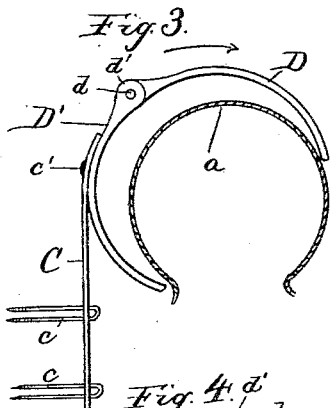
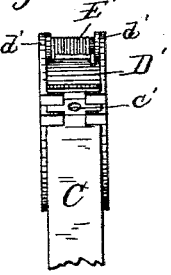
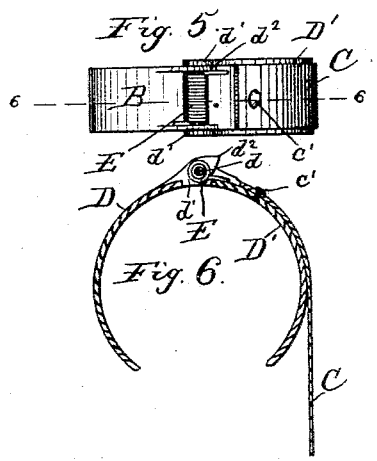
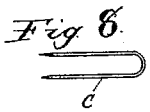
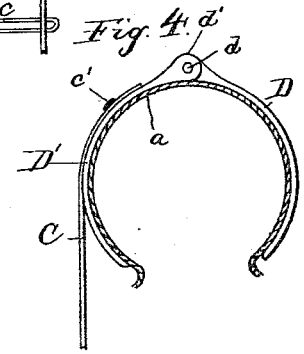
Witnesses:
Lew. E. Curtis.
T. S. Paré
Inventor:
Frederick Benoit.
By Munday Evarts & Adcock
his Attorneys

UNITED STATES PATENT OFFICE.

FREDERICK BENOIT, OF CHICAGO, ILLINOIS.

SWEAT-PAD FASTENING FOR HORSE-COLLARS.

SPECIFICATION forming part of Letters Patent No. 369,496, dated September 6, 1887.

Application filed May 17, 1886. Serial No. 202,434. (No model.)

*To all whom it may concern:*

Be it known that I, FREDERICK BENOIT, a citizen of the United States, residing in Chicago, in the county of Cook and State of Illinois, have invented a new and useful Improvement in Sweat-Pad Fastenings for Horse-Collars, of which the following is a specification.

My invention relates to devices for removably fastening sweat-pads upon horse-collars. Heretofore these fasteners have ordinarily consisted of a tempered steel spring made of sheet metal or wire secured at one end to the pad and curved at the other, so as to embrace the roll of the collar, as illustrated, for example, in the patents to McClain, No. 267,011, or to Scherling, No. 298,626. A serious objection is found in the practical operation or use of such fastenings owing to the liability of the curved springs getting sprung out of shape to properly fit and clamp the roll of the collar, and also owing to the liability of such tempered springs when made of sheet metal to break, especially in cold weather. Such fastenings are peculiarly liable to be sprung out of shape in attaching them to and removing them from the collar unless great care is exercised in not springing the curved clamp too far. Heretofore, also, pad-fasteners have been made, such as shown and described in Patent No. 335,382, to Osmer, of February 2, 1886, and wherein a shank riveted at one end to the pad is provided with a curved end to which a curved arm is pivoted, and thus forms a hook which partially embraces the roll of the collar.

It is the object of my invention to provide an efficient and durable fastener of a cheap and simple construction, by means of which the pad may be adjustably secured in any desired position on the collar and conveniently and easily removed or applied, and whereby the defects in the fasteners now commonly in use may be obviated.

To this end my invention consists in a pair of rigid curved clamps hinged or pivoted together and adapted to embrace the roll of the collar, and provided with a spring at their joint or pivot to force them together around the roll of the collar. One of these curved clamp-arms is connected by a suitable strip of sheet metal, rawhide, or other like material with the pad. The spring at the joint of the clamp-arms may preferably be a coil-spring, in which case it may surround the pivot-pin by which the two clamp-arms are hinged together. The curved clamp-arms are furnished with a stop or projection to limit the extent to which they may be opened, and thus prevent injury to the spring or undue strain thereon. The strap or strip connecting the clamp to the pad is preferably hinged or pivoted to the clamp, so as to permit the pad to freely adjust itself to the collar without throwing undue strain upon the fastening. The curved clamp arms may be made of forged steel under a drop-hammer, or of cast metal, such as brass or copper or malleable iron. When made of iron or steel, they are preferably metal-plated to prevent rusting on exposure to the weather.

In my invention, it will be observed, there are two independent curved clamps or arms pivoted together at their adjoining ends, and having their outer ends free to completely encircle the roll of the collar, as the strap by which the clamps are attached to the pad is secured to the curved clamp-arm at a point between the ends of said clamp-arm and preferably at about the middle thereof.

In the accompanying drawings, which form a part of this specification, and in which similar letters of reference indicate like parts, Figure 1 is a side elevation of a collar and pad furnished with my invention. Fig. 2 is an enlarged cross-section on line 2 2 of Fig. 1. Figs. 3 and 4 are end or edge views of the curved clamp-arms, showing the same partially applied to the roll of the collar. Fig. 5 is a back or plan view of the clamp-arms. Fig. 6 is a section on line 6 6 of Fig. 5. Fig. 7 shows a slight modification in which the connecting-strip is rigidly secured to the clamp, and Fig. 8 is a detail view of the staple by which the connecting-strip is secured to the pad.

In said drawings, A represents a collar; B, a sweat-pad; C, the connecting-strip, and D D' the curved hinged clamp-arms which embrace and clamp the front roll, *a*, of the collar. The curved clamp-arms D D' are pivoted together at their adjoining ends by a pin, *d*, extending through ears *d' d'* on said curved arms. The arm D is also furnished with projections or lugs $d^2$, which strike against the end of the arm D' and limit the extent to which said arms may be opened.

E is the spring by which the curved arms D D' are forced together. It is preferably a coil-spring, one end of the coil fitting against one of the curved arms and the other end fitting against the other curved arm. The connecting-strip C is secured to the pad B by staples $c$, driven through the same and clinched. These staples are sharp-pointed and puncture or force their way through the pad without cutting or injuring the same.

Where rivets are used, as heretofore, to secure the fastener to the pad, it is necessary to cut or punch a hole through the pad, thus greatly injuring it. The other end of the connecting-strip C is pivotally secured to the clamp-arm D' by a rivet or pin, $c'$, so that the pad may adjust itself or move slightly on the collar. It may, however, be secured rigidly to the clamp-arm, as indicated in Fig. 7, in which case the clamp-arm may be provided with flanges embracing or partially embracing the end of the connecting-strap C. The hinge or pivot $d$ between the clamp-arms D D' should be located or arranged to come about centrally of the roll $a$ of the collar.

I claim—

1. A sweat-pad collar fastening consisting of a pair of rigid or non-elastic hinged curved clamp-arms adapted to embrace the roll of the collar, a spring for forcing them together, and a connecting-strip secured to one end of said curved clamp-arms between the ends thereof, substantially as specified.

2. The combination, with curved rigid clamp-arms D D', pivoted together, one of said clamp-arms being provided with a stop or projection to limit the extent to which they may be opened, of a spring for forcing them together and a strip, C, for connecting them to the pad, substantially as specified.

3. The combination, with curved clamp-arms D D', pivoted together, of a spring for forcing them together and a connecting-strip secured to the pad and pivotally connected to one of said clamp-arms, substantially as specified.

4. The combination, with curved clamp-arms D D', of pivot-pin $d$, coil-spring E, surrounding said pin, one of said clamp-arms being provided with a stop or projection fitting against the other to limit the extent to which they may be opened, and a strip, C, for connecting said clamp-arms to the pad, substantially as specified.

FREDERICK BENOIT.

Witnesses:
 EDW. S. EVARTS,
 LEW. E. CURTIS.